(12) United States Patent
Miller

(10) Patent No.: US 8,574,407 B2
(45) Date of Patent: Nov. 5, 2013

(54) PLASMONIC STRUCTURES FOR MEDIATING CHEMICAL TRANSFORMATION

(75) Inventor: Michael A. Miller, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 224 days.

(21) Appl. No.: 13/009,163

(22) Filed: Jan. 19, 2011

(65) Prior Publication Data

US 2011/0180386 A1 Jul. 28, 2011

Related U.S. Application Data

(60) Provisional application No. 61/298,264, filed on Jan. 26, 2010.

(51) Int. Cl.
*G02B 5/00* (2006.01)
*B01J 19/12* (2006.01)
*B01J 19/08* (2006.01)
*C01B 3/00* (2006.01)

(52) U.S. Cl.
USPC ................................. 204/157.15; 422/186.04

(58) Field of Classification Search
CPC ....................................................... G02B 5/008
USPC ................................ 204/157.15; 422/186.04
See application file for complete search history.

(56) References Cited

U.S. PATENT DOCUMENTS

| | | | | |
|---|---|---|---|---|
| 4,481,091 A * | 11/1984 | Brus et al. | ................. | 204/157.15 |
| 7,318,907 B2 * | 1/2008 | Stark et al. | ...................... | 422/50 |
| 7,931,858 B1 * | 4/2011 | Gross et al. | ............. | 204/157.15 |
| 2004/0245085 A1 * | 12/2004 | Srinivasan | ............... | 204/157.15 |
| 2007/0017795 A1 * | 1/2007 | Hyde | ........................ | 204/157.15 |
| 2007/0017796 A1 * | 1/2007 | Hyde | ........................ | 204/157.15 |
| 2007/0017797 A1 * | 1/2007 | Hyde | ........................ | 204/157.15 |
| 2007/0020157 A1 * | 1/2007 | Hyde | ........................ | 204/157.15 |
| 2007/0215843 A1 * | 9/2007 | Soukoulis et al. | ............. | 252/570 |
| 2008/0154431 A1 * | 6/2008 | Defries et al. | ................. | 700/266 |
| 2009/0145742 A1 * | 6/2009 | Mirkin et al. | ............. | 204/157.15 |
| 2010/0035335 A1 * | 2/2010 | Lakowicz et al. | ........... | 422/82.08 |
| 2010/0188663 A1 * | 7/2010 | Glazier et al. | .............. | 422/82.09 |
| 2011/0235032 A1 * | 9/2011 | Miller et al. | ................... | 204/164 |

OTHER PUBLICATIONS

Miller et al, "The Role of Low-Frequency Plasmons in Molecular Adsorption: A Theoretical and Spectroscopic Study of Gold and Titanium Compounds," J. Phys. Chem. C (2008) vol. 112, pp. 6939-6946.*
Fainman et al, "Surface Plasmonic Fields in Nanophotonics," Optics and Photonics News, Jul./Aug. 2006, pp. 24-29.*

(Continued)

*Primary Examiner* — Keith Hendricks
*Assistant Examiner* — Colleen M Raphael
(74) *Attorney, Agent, or Firm* — Grossman, Tucker et al

(57) ABSTRACT

The present invention relates to plasmonic structures of metal dielectrics and their use in corresponding processes that elicit surface plasmons which may then be employed to influence a chemical transformation. The frequency of a plasmon may be tuned to couple with a selected vibrational mode of a selected molecule to undergo a selected transition, such as transitions to a metastable state, bond rearrangement and/or chemical transformation via the breaking and reforming of bonds.

18 Claims, 18 Drawing Sheets

(56) References Cited

OTHER PUBLICATIONS

Mattioli et al, "Substrateless metamaterials and mid-infrared frequencies," available online at http://arxiv.org/ftp/arxiv/papers/0907/0907.4586.pdf, submitted to arxiv.org on Jul. 27, 2009, see http://arxiv.org/abs/arXiv:0907.4586.*

Miller et al, Project ST28, DOE Hydrogen Program, DOE Annual Merit Review, Jun. 9-13, 2008.*

Silveirinha, "Artificial plasma formed by connected metallic wires at infrared frequencies," Phys. Rev. B, vol. 79, 035118 (2009).*

Rodriguez-Fortuño et al, "Coaxial plasmonic waveguide array as a negative-index metamaterial," Optics Letters, Nov. 1, 2009, vol. 34, No. 21, pp. 3325-3327.*

Gansel, et al., "Gold Helix Photonic Metamaterial as Broadband Circular Polarizer," Science vol. 325, Sep. 18, 2009, pp. 1513-1515.

Norton, et al., "Silica Nanosprings—A Novel Nanostructured Material for Hydrogen Storage," Clean Technology 2009, pp. 202-205.

Belov, et al, "Subwavelength microwave imaging using an array of parallel conducting wires as a lens," Physical Review B 73, 033108 (2006) (4 pages).

M.A. Miller "Engineering of Metasurfaces to Control Molecular Interactions via Surface Plasmons"; 1 sheet—presented at the Nanotechnology for Defense Conference on Oct. 24-27, 2011, Bellevue, Washington.

M.A. Miller "Structures for Coupling Surface Plasmon-Molecule Interactions in Vibrational Resonance: A Venue for Chemical Catalysis"; presented at the Fourth International Congress on Advanced Electromagnetic Materials in Microwaves and Optics-Metamaterials 2010, on Sep. 13-16, 2010; ISBN 978-952-92-7734-6, Metamaterials 2010; 6 pgs.

M.A. Miller "Metamaterial Structures for Resonant Coupling of Surface Plasmons and Molecular Vibrations: Applications to Infrared Photocatalysis and Sensors", presented at the 4th International Workshop on Electromagnetic Metamaterials, Santa Ana Pueblo, NM, Aug. 11-12, 2010; 28 pgs.

M.A. Miller, et al "Plasmonic Structures for Surface Plasmon-Mediated Molecular Binding and Catalysis under Vibrational Resonance", presented at the Fifth International Workshop on Electromagnetic Metamaterials, Mar. 26, 2012, Albuquerque, NM; 22 pgs.

Miller et al., "The Role of Low-Frequency Plasmons in Molecular Adsorption: A Theoretical and Spectroscopic Study of Gold and Titanium Compounds," J. Phys. Chem. C 2008, 112, 6939-6946.

Kresin, "Photoabsorption of small metal clusters: Surface and volume modes," Physical Review B Condensed Matter, Third Series, vol. 42, No. 6, Aug. 15, 1990—II pp. 3247-3252.

Wang, et al., "Collective electronic excitations and their damping in small alkali clusters," Chemical Physical Letters, vol. 205, No. 6, Apr. 23, 1993, pp. 521-528.

Mohr et al., "Hydrogenation properties of supported nanosized gold particles," Science Progress (2001), 84 (4), 311-334, pp. 311-334.

Egri, "The Internal Structure of Plasmons," Z. Phys. B—Condensed Matter, 53, 183-189 (1983).

Haynes, et al., "Nanosphere Lithography: A Versatile Nanofabrication Tool for Studies of Size-Dependent Nanoparticle Optics," J. Phys. Chem. B 2001, 105, 5599-5611.

Ozbay, "Plasmonics: Merging Photonetics and Electronics at Nanoscale Dimensions," Science vol. 311, Jan. 13, 2006, pp. 189-193.

Smekal, "Zuschriften und vorlaufige Mitteilungen." Naturwissenschaften,1923, 11, 873.

Raman, "A weekly journal of science," Nature, No. 3066, vol. 122, Aug. 4, 1928, p. 169.

Leiro, et al., "Study of plasmon structure in XPS spectra of silver and gold," J. Phys. F: Met. Phys. 13 (1983) 215-221.

Pendry, et al., "Mimicking Surface Plasmons with Structured Surfaces," Science vol. 305, Aug. 6, 2004, pp. 847-848.

Hibbins, et al., "Experimental Verification of Designer Surface Plasmons," Science vol. 308, Apr. 29, 2005, pp. 670-672.

Pendry, et al., "Extremely Low Frequency Plamons in Metallic Mesostructures," Physical Review Letters, vol. 76, No. 25, Jun. 17, 1996, pp. 4773-4776.

Shir, et al., "Three-Dinemsional Nanofabrication with Elastomeric Phase Masks," J. Phys. Chem. B 2007, 111, 12945-12958.

Jeon, et al., "Molded transparent photopolymers and phase shift optics for fabricating three dimensional nanostructures," Optics Express, vol. 15, No. 10, May 14, 2007, pp. 6358-6368.

Govorov et al, "Theory of Circular Dichroism of Nanomaterials Comprising Chiral Molecules and Nanocrystals: Plasmon Enhancement, Dipole Interactions and Dielectric Effects"; 2010 American Chemical Society, NANO Letters, pubs.acs.org/Nano.Lett—Publication Date (Web): Feb. 25, 2010, Nano Letters, 2010, 10, 1374-1382.

Valev et al, "Asymmetric Optical Second-Harmonic Generation From Chiral G-Shaped Gold Nanostructures", 2010 The American Physical Society, Physical Review Letters 104, wk ending Mar. 26, 2010, 127401-1/4.

Fedotov et al, Asymmetric Transmission of Light and Enantiomerically Sensitive Plasmon Resonance in Planar Chiral Nanostructures, 2007 American Chemical Society, Nano Lett., 2007, 7 (7), pp. 1996-1999, DOI: 10.1021/nl0707961; Publication Date (Web): Jun. 20, 2007 - - - Abstract Only - - -.

* cited by examiner

PLASMONIC STRUCTURES FOR MEDIATING CHEMICAL TRANSFORMATION

CROSS REFERENCE TO RELATED APPLICATIONS

The present application claims the benefit of the filing date of U.S. Provisional Application Ser. No. 61/298,264, filed Jan. 26, 2010, the teachings of which are incorporated herein by reference.

FIELD OF THE INVENTION

The present invention relates to plasmonic structures that elicit surface plasmons which may then be employed to influence a chemical transformation. More specifically, the frequency of a plasmon may now be tuned to couple with a selected vibrational mode of a selected molecule to undergo a selected transition, such as by way of example, transitions to a metastable state, bond rearrangement and/or chemical transformation via the breaking and reforming of bonds.

BACKGROUND

Plasmons are understood to be a quantum of plasma oscillation. Plasmons may be classically described as an oscillation of a free electron density against a fixed positive ion in a metal. Electrons may move in one direction (uncovering positive ions) in the presence of an external electric field until they cancel the field inside the metal. In the absence of the electric field the electrons may shift and be repelled by one another and attracted to the positive ions. The electrons may then oscillate back and forth at the plasma frequency until energy may be lost in some kind of resistance or damping. Plasmons are the quantization of this type of oscillation.

Surface plasmons, which may also be known as surface plasmon polaritons (SPPs) are surface electromagnetic waves that propagate in a direction parallel to a metal/dielectric or metal/vacuum interface. As the wave is on the boundary of the metal and external medium (air or water for example), these oscillations may be very sensitive to any change of this boundary, such as the adsorption of molecules to the metal interface.

SUMMARY

In one exemplary embodiment, the disclosure herein relates to a structure capable of causing a chemical transformation of a molecule on the surface of the structure comprising a metal dielectric structure capable of surface plasmon modes at selected frequencies to provide a surface-bound electric field. The electric field will be present when the structure is excited by an external source and/or the vibrational dipole created by a molecule or molecules adsorbed on the metal dielectric surface. The surface-bound electric field is capable of coupling with a molecule on the surface of the metal dielectric structure, wherein the molecule undergoes a chemical transformation.

In another exemplary embodiment, the disclosure herein relates to a process for causing a chemical transformation of a molecule on the surface of a structure. This process may begin with providing a metal dielectric structure capable of surface plasmon modes at selected frequencies providing a surface-bound electric field, where the electric field is present when the structure is excited by an external source and/or the vibrational dipole created by a molecule or molecules adsorbed on the metal dielectric surface. The surface-bound electric field is then capable of coupling with a molecule on the surface of the metal dielectric structure, wherein the molecule undergoes a chemical transformation due to molecular vibration and wherein the coupling between the surface-bound electric field of the plasmon mode and the molecular vibration are: (i) detected as absorption and/or change in transmission; and/or (ii) detected as a heat flow relative to a reference state utilizing a thermal detector.

DETAILED DESCRIPTION

Figure 1:
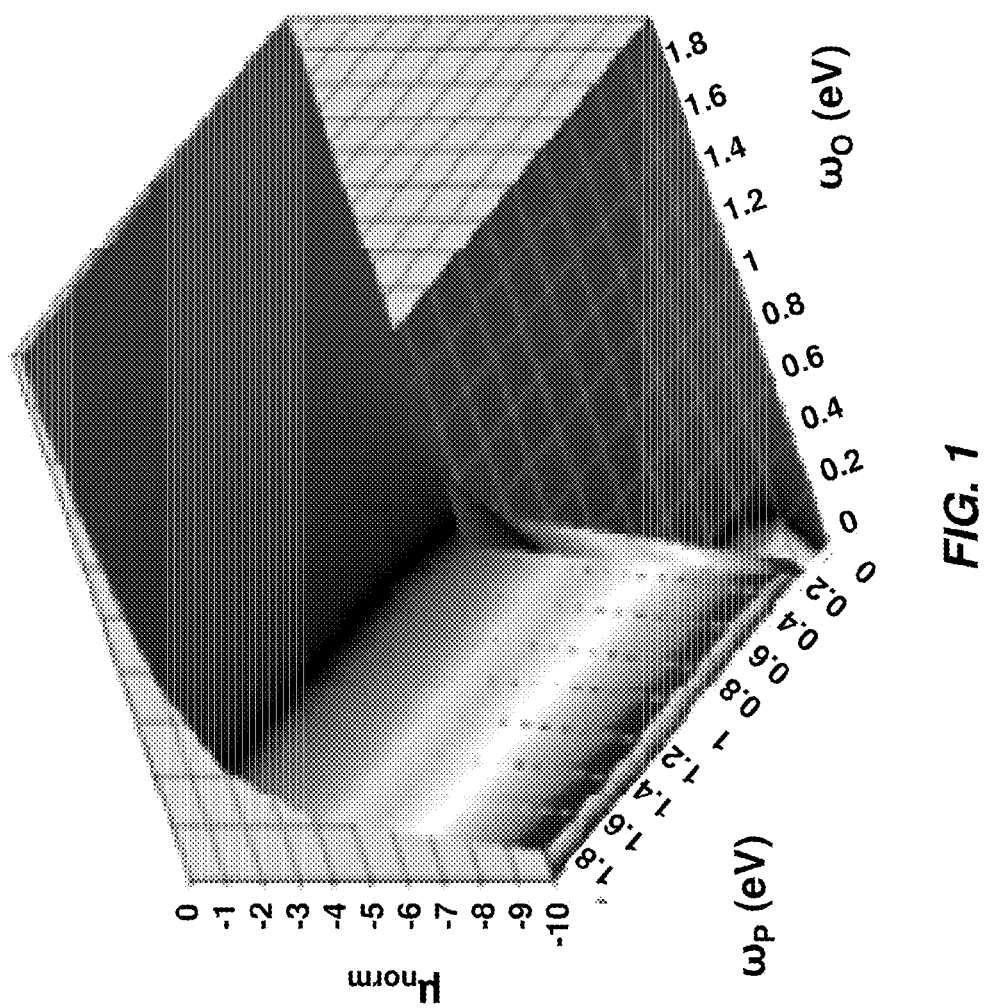
FIG. 1 illustrates the dependence of the normalized surface-induced dipole moment ($\mu_{norm}$) on the plasmon frequency ($\omega_p$) and excitation frequency ($\omega_0$).

Hybrid materials consisting of at least one metal (e.g., gold, silver, copper, or lithium) and/or a metallic alloy (e.g. AuLi, $AuAl_2$, $AuGa_2$, $AuIn_2$, $AuNa_2$ or $TiB_2$) and one dielectric (e.g., polymer, ceramic, a non-conducting metal alloy or air) which are engineered to form an extended structure of smaller repeating units, exhibit unique properties when they interact with an electromagnetic (EM) field, such as light, at wavelengths often much larger than the unit structure. These hybrid materials may be understood herein as "metamaterials" as a consequence of their indicated compositional framework. A dielectric herein may be understood as any material that is an electric insulator and may only polarize within a given electrical field.

An important phenomenon that emerges from certain types of metamaterial structures is the proficiency in which surface plasmon-polaritons (SPPs) are excited therefore providing a surface plasmon mode. Plasmons may be attributed to the collective oscillations of free electrons in the metal-component of the metamaterial structure which in turn may then generate a spatially-intense oscillating EM field confined to the interface between the metal surface and the dielectric.

The theoretical framework describing the interaction between photon- and dipole excited SPPs and the vibrational wavefunctions now demonstrates that such coupling may lead to enhanced binding interactions of surface molecules and/or catalysis of chemical transformations. Experimental validation of this plasmon-mediated chemical binding and catalysis effects has remained elusive until now because metamaterials that elicit SPPs at frequencies of molecular vibrations (infrared) were not experimentally accessible. Infrared herein may be understood as electromagnetic radiation with a wavelength between 0.7 and 300 micrometers, which equates to a frequency range between approximately 1 and 430 THz.

It may now be shown through modeling and simulations that, under certain conditions, the excitation within the infrared (e.g. at 132 THz) SPPs can be realized, preferably from structures consisting of 3-D metal-wire grids with periodic cubic symmetry. It is further shown that the local electric field of the SPP may be several orders of magnitude higher than the amplitude of the incident field. The present disclosure is therefore directed towards employing such surface plasmons to influence chemical transformations of an exposed molecule or molecules.

A chemical transformation herein may be understood to include, but not be limited to, any transition of a selected molecule with respect to its electron bonding behavior or characteristics and/or bonding configurations (e.g. single versus double bonds and/or the formation of new bonds within the elements present or between the chemical compounds present). Chemical transformation herein may also include transitions to a metastable state (i.e. a state where the structure under consideration is in a relatively unstable state or first state and seeks to transition to a relatively more stable state or second state). An example of the metastable state may include, e.g., formation of a free radical and/or cationic and/or anionic charge. A transformation of bonding configurations may be achieved, e.g., by promoting a chemical reaction such as chemical reduction. Accordingly a chemical transformation herein may also include bond rearrangement and/or chemical transformation through breaking and reforming of bonds. A chemical transformation herein may also include isomerization, such as, for a given molecule or molecules, the formation of stereo enantiomers (i.e. the formation of a stereoisomer of a given molecule that is not superimposable with respect to the original molecule).

In addition, the chemical transformation noted above may occur by the coupling of the surface-bound electric field of the plasmon mode with the molecule's vibrations. That is, it may be understood that coupling refers to interaction of the surface-bound electric field of the plasmon mode with the molecule to achieve some level of vibrational resonance, thereby causing a chemical transformation within the molecule as noted herein.

Surface-induced vibrational dipole ($\mu_{norm}$) in a molecule on the surface of a metal can couple with and excite SPPs such that $\mu_{norm}$ rapidly increases as the excitation frequency of the molecule decreases, falling into a coulombic trap (i.e., large gradient in $\mu_{norm}$) as vibrational transitions comparable to plasmon frequencies are approached (FIG. 1). Such is the case when the frequency of a molecular transition is degenerate with the plasmon frequency ($\omega_0 = \omega_p$). The implication of this theoretical result is that the vibrational dipole couples with the SPP on resonance, and the electric field associated with this vibrational coupling is dominated by the SPP.

Figure 2:
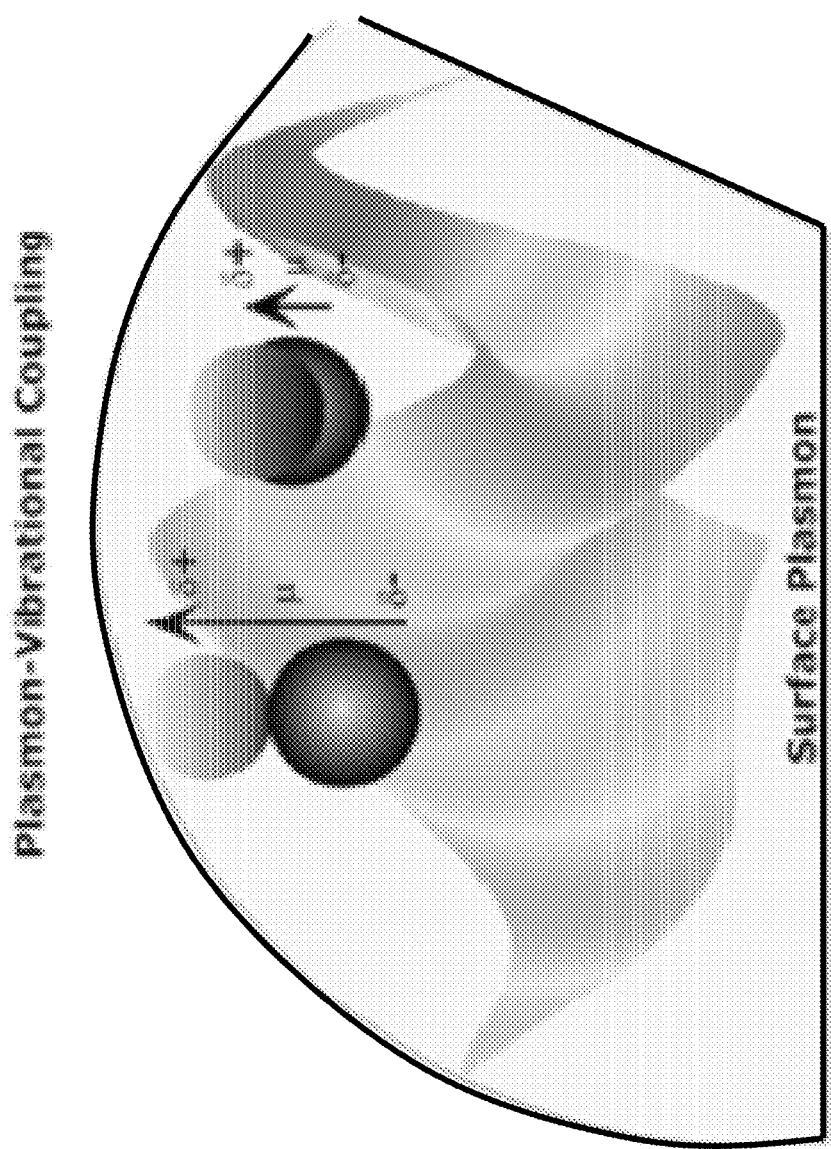
FIG. 2 illustrates the coupling of a surface-induced vibrational dipole of a quadrupolar molecule and surface plasmon.
Figure 3A:
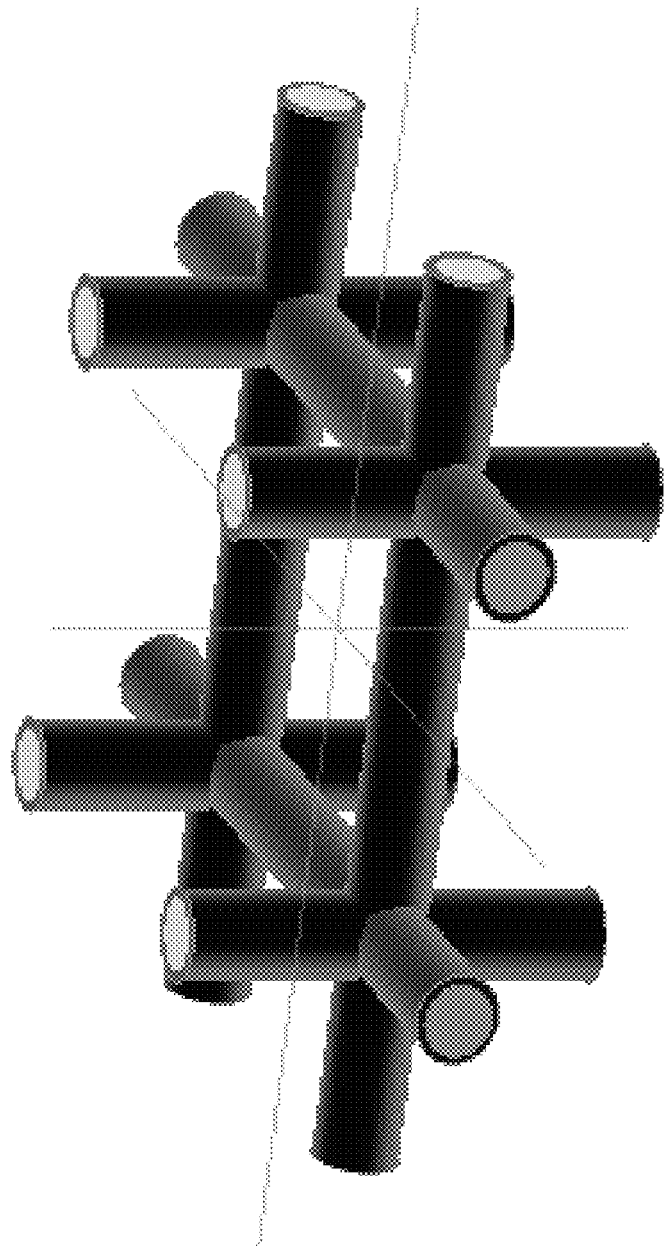
FIG. 3A is a three-dimensional wire grid FDTD model comprising a dielectric wire substrate (SU-8, 80 nm diameter) and a gold conformal coating (10 nm thick) with a unit cell dimension of 504 nm.
Figure 3B:
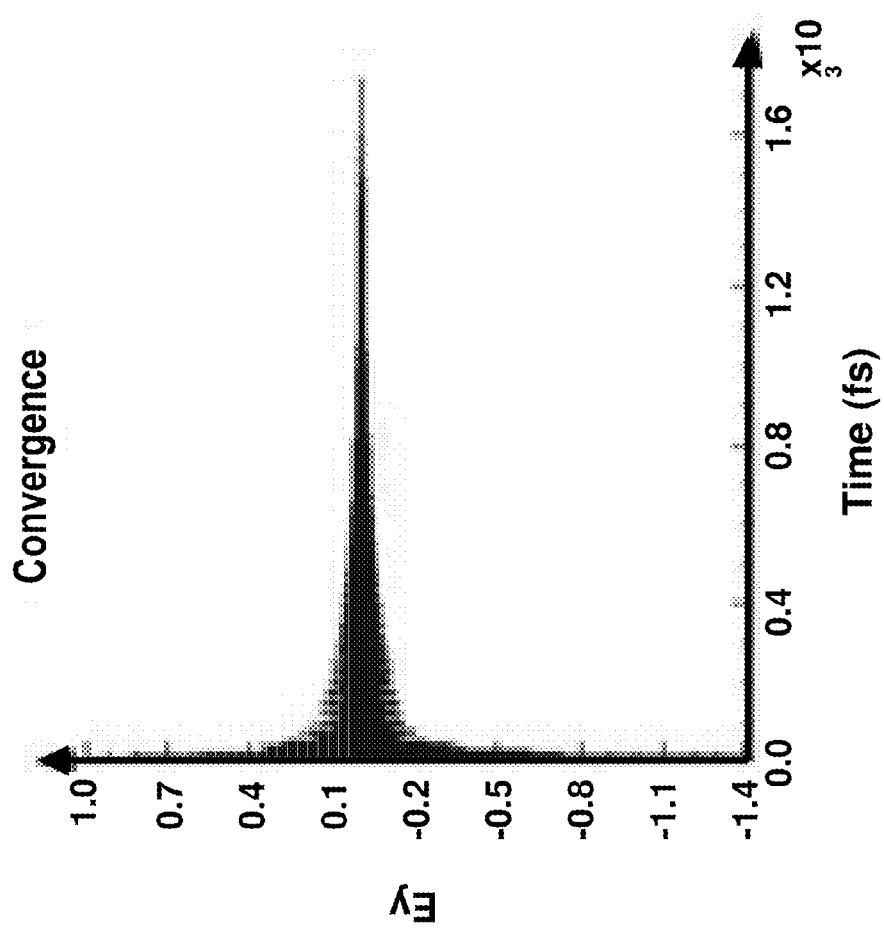
FIG. 3B is a plot of convergence for the Ey component of the electric field to the wire grid of FIG. 3A.
Figure 3C:
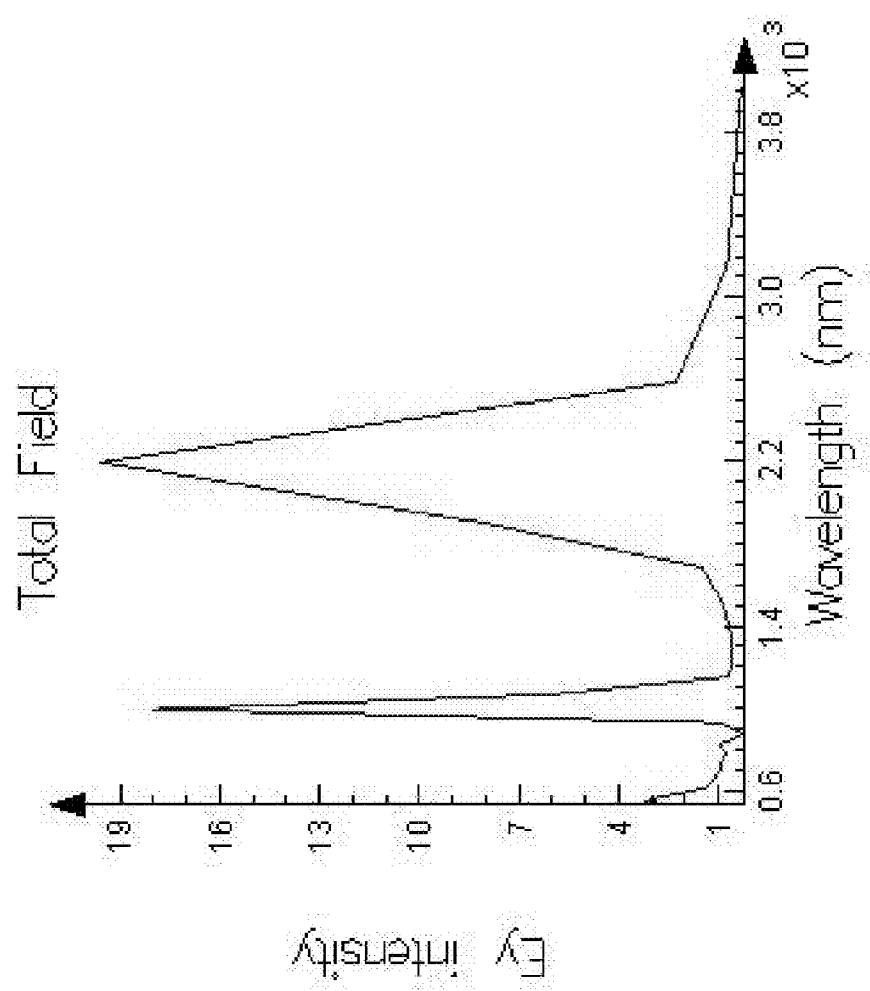
FIG. 3C is the total field resonances predicted from the FDTD model in FIG. 3A, showing that the unit cell and wire dimensions employed in the coated-grid model yields relatively strong resonances at 993 nm and 2196 nm.
Figure 3D:
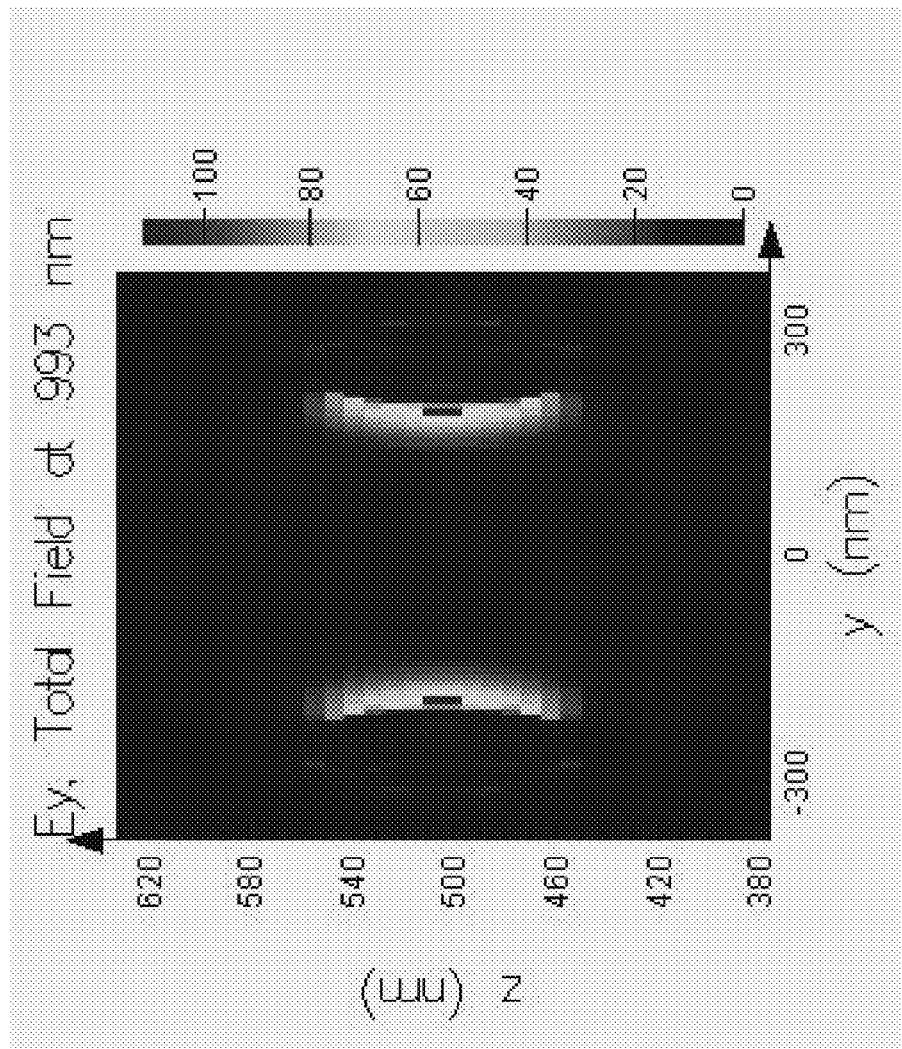
FIGS. 3D and 3E indicate the total electric field maps for Ey (YZ plane) showing excitation of SPPs on the surface of vertical coated wires.
Figure 3E:
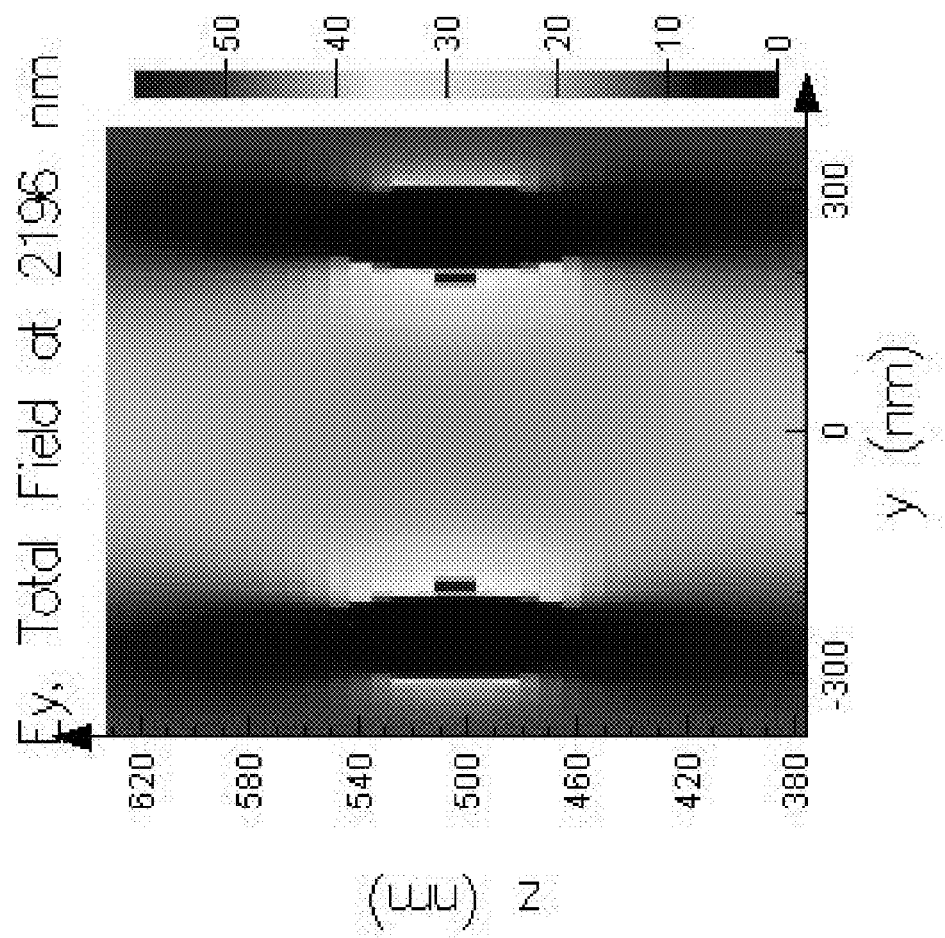

This effect is now illustrated in FIG. 2 for an isotropic wavefunction of the SPP for collective excitation from the ground state at a finite temperature. Specifically, FIG. 2 shows the coupling of a surface-induced vibrational dipole of quadrupolar molecule and a surface plasmon. As additional molecules are adsorbed to the surface, the van der Waals interactions among surface molecules are significantly attenuated by the electric field of the surface plasmon, and there arises a distance dependence of this attenuated field spread over the surface of the metal. Under certain conditions as might be the case for an external radiational field, such as a blackbody source, the SPP field attenuation may be strong enough to mediate a chemical transformation, such as dissociation. For $CO_2$ as an example, the on-resonance condition is near 2349 cm$^{-1}$ (0.291 eV) for the ground-state asymmetric stretching mode, which is relatively lower than the lowest plasmon frequency of most pure metals (e.g., gold: $\omega_p = 2.7$ eV). This dilemma can now be overcome by considering mesoscale architectures which give rise to SPPs with relatively low frequencies.

Structured surfaces, such as arrayed holes and nanowires and metallic mesostructures may exhibit SPPs in the infrared and microwave regions. Very large near-field effects may arise from resonant coupling between an external field and the SPPs in these systems. Using ab initio and classical (Maxwell's equations) levels of theory, one exemplary embodiment of this disclosure relates to free-standing (3-D) wire grids of cubic symmetry that can now be tailored to evince SPPs with infrared (IR) frequencies.

Figure 4:
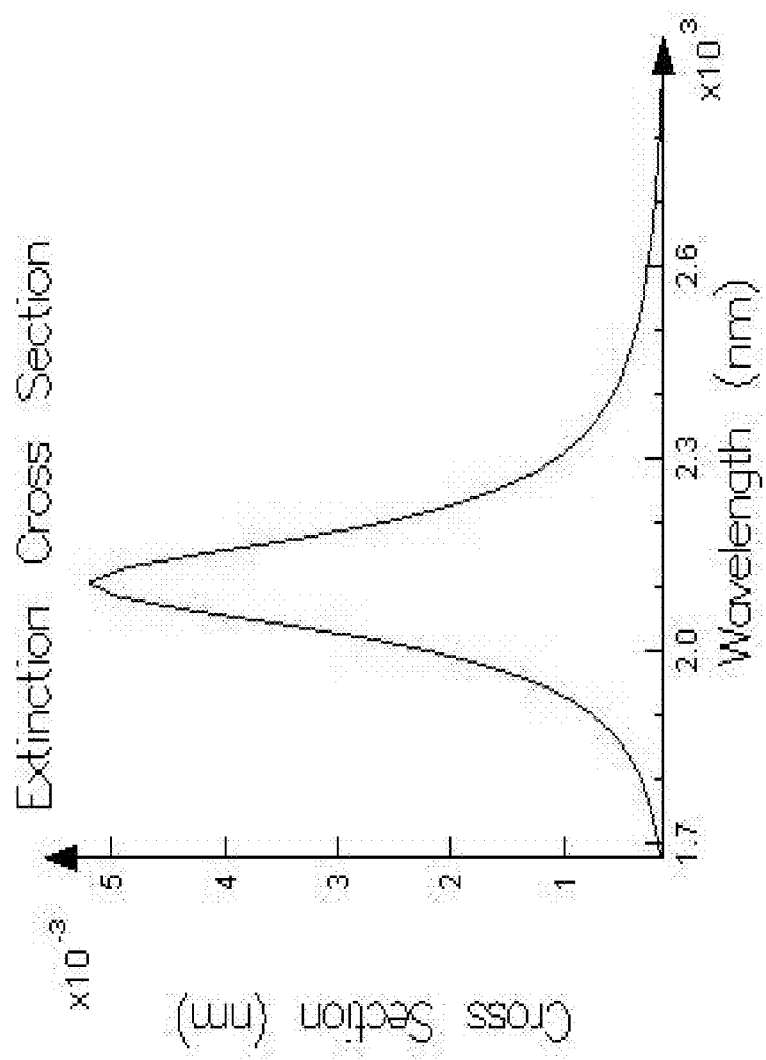
FIG. 4 illustrates the extinction cross-section computed near the surface plasmon resonance of a three-dimensional wire grid (504 nm unit cell dimension, 80 nm diameter with a gold conformal coating (10 nm thick).

These IR SPPs may couple directly (i.e., are in resonance) with ground state fundamental vibrations of dihydrogen (132 THz, FIGS. 3 and 4). FIG. 3A illustrates a 3-D wire grid FDTD model consisting of a dielectric wire substrate (SU-8, 80 nm diam) and a gold conformal coating (10 nm thick), with a unit cell dimension of 504 nm. FIG. 3B provides a plot of time convergence for the Ey component of the electric field. FIG. 3C illustrates total field resonances predicted by the FDTD model, showing that the unit cell and wire dimensions employed in the coated-grid model yields relatively strong resonances at 993 and 2196 nm, the latter of which compares favorably with the desired resonance of 2275 nm (4395 cm$^{-1}$) for the fundamental vibrations of dihydrogen. FIGS. 3D and 3E illustrate total electric field maps for Ey (YZ plane) showing excitation of SPPs on the surface of the vertical coated wires (dark regions are outlines of the vertical wires). FIG. 4 illustrates the extinction cross-section computed near the surface of plasmon resonance of a 3-D wire grid (504 nm unit cell), 80 nm wire plus 10 nm gold coating.

Figure 5:
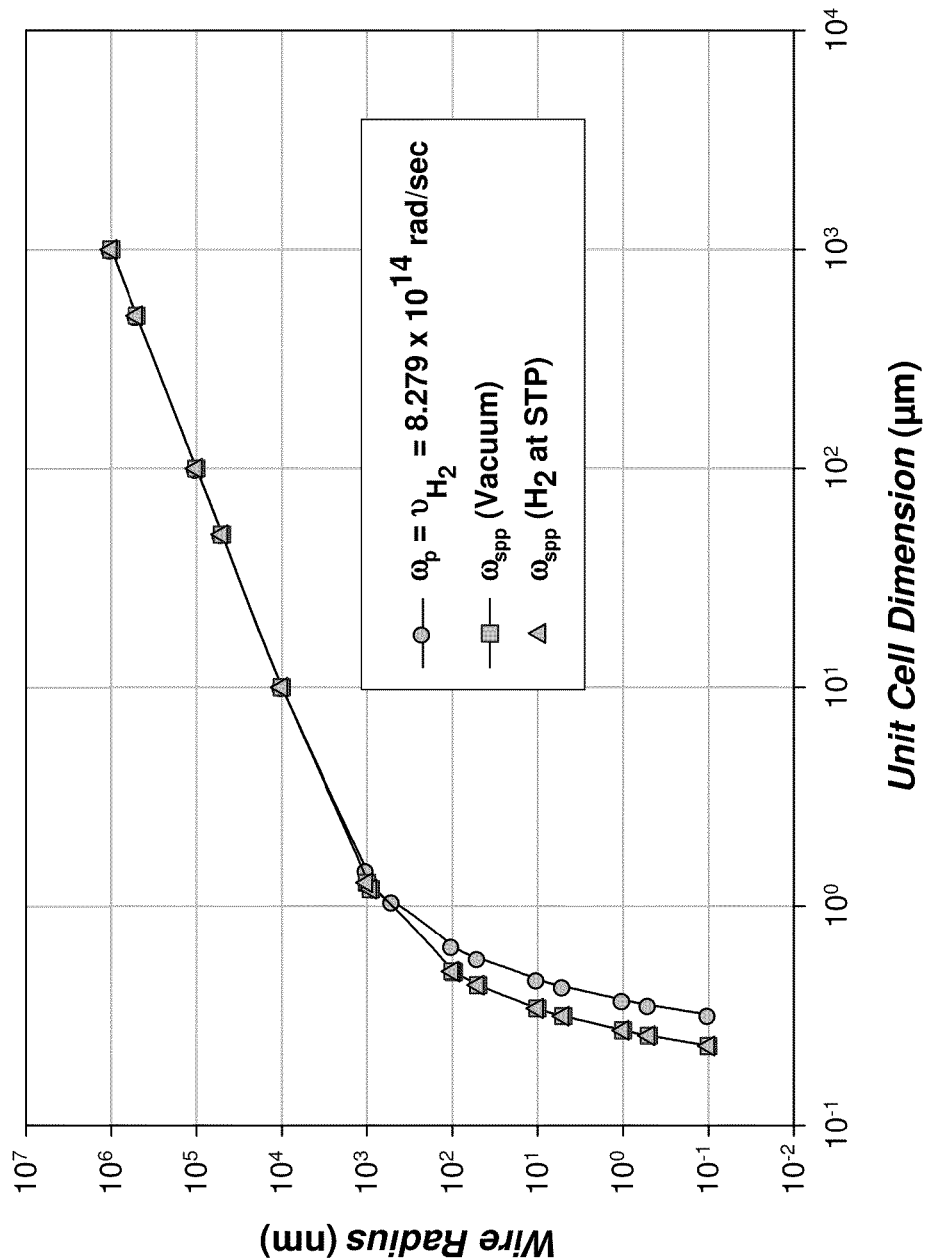
FIG. 5 shows analytic solutions for the relationship between cell dimensions and wire diameter suitable for plasmon and surface plasmon polariton (SPP) excitation in resonance with the fundamental vibrations of dihydrogen in a 3D wire mesh structure.
Figure 6A:
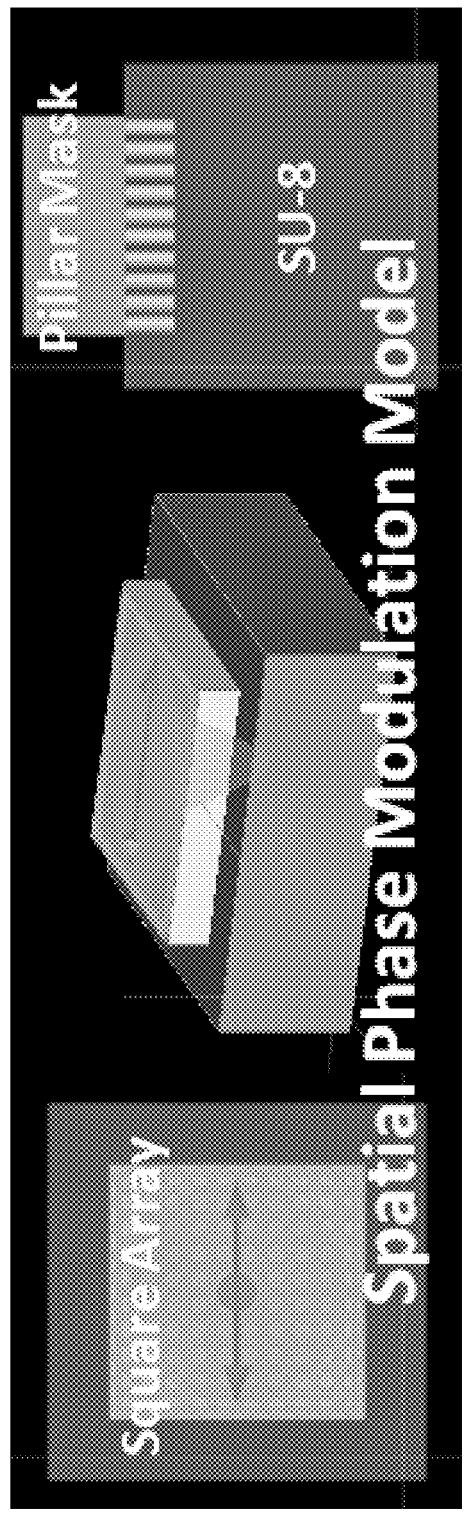
FIG. 6A-6I shows the simulated spatial phase modulation generated by an elastomeric OPM embedded thick slab of an SU-8 photoresist.
Figure 6B:
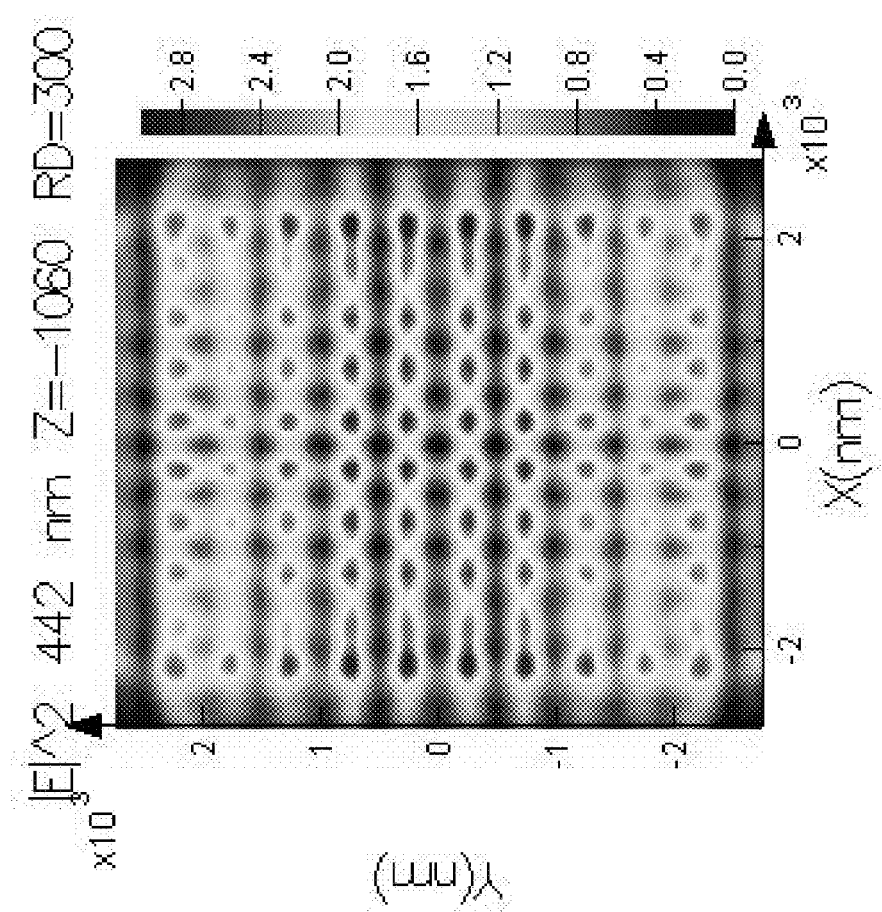
Figure 6C:
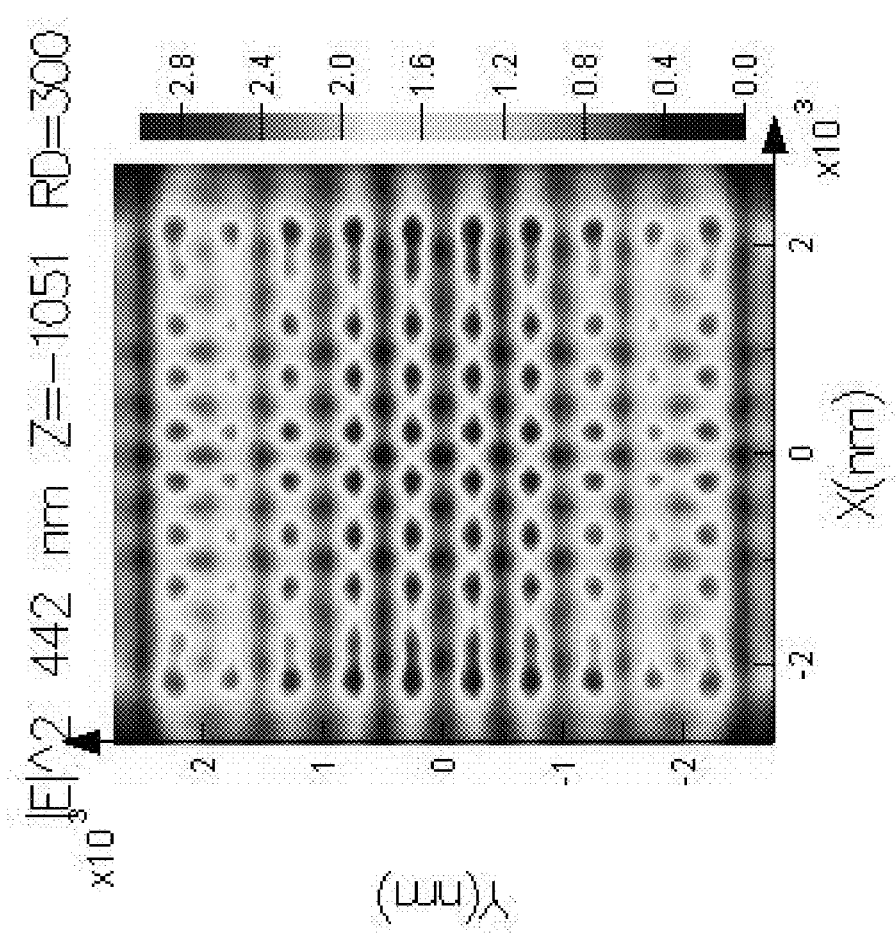
Figure 6D:
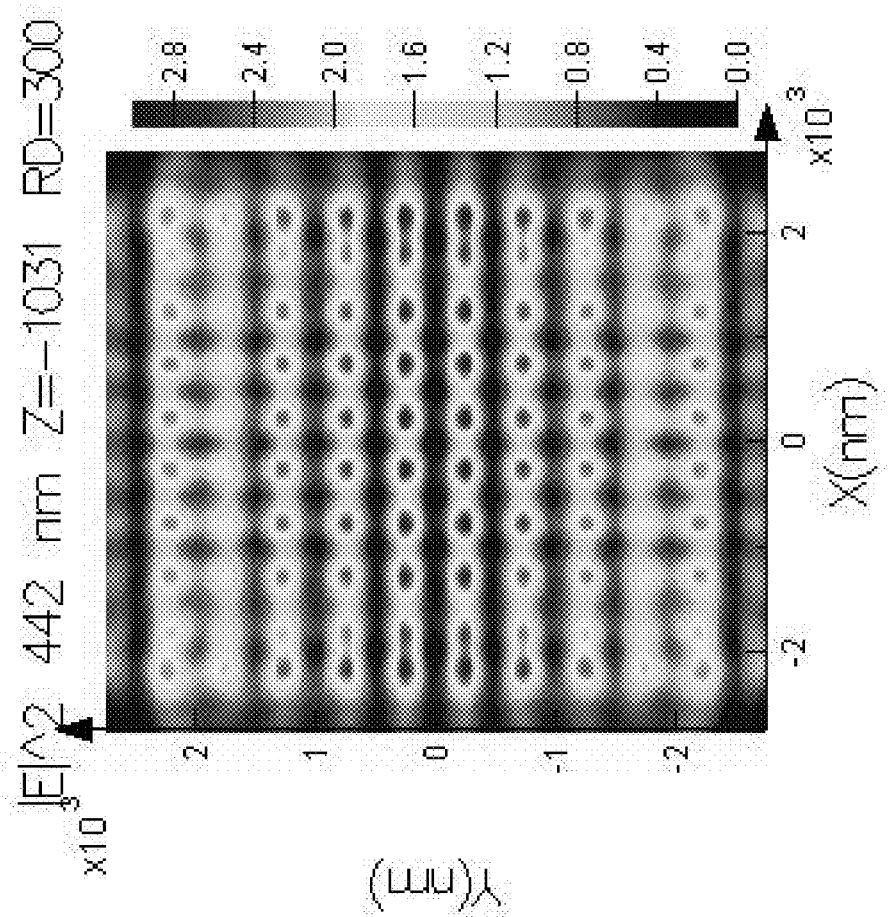
Figure 6E:
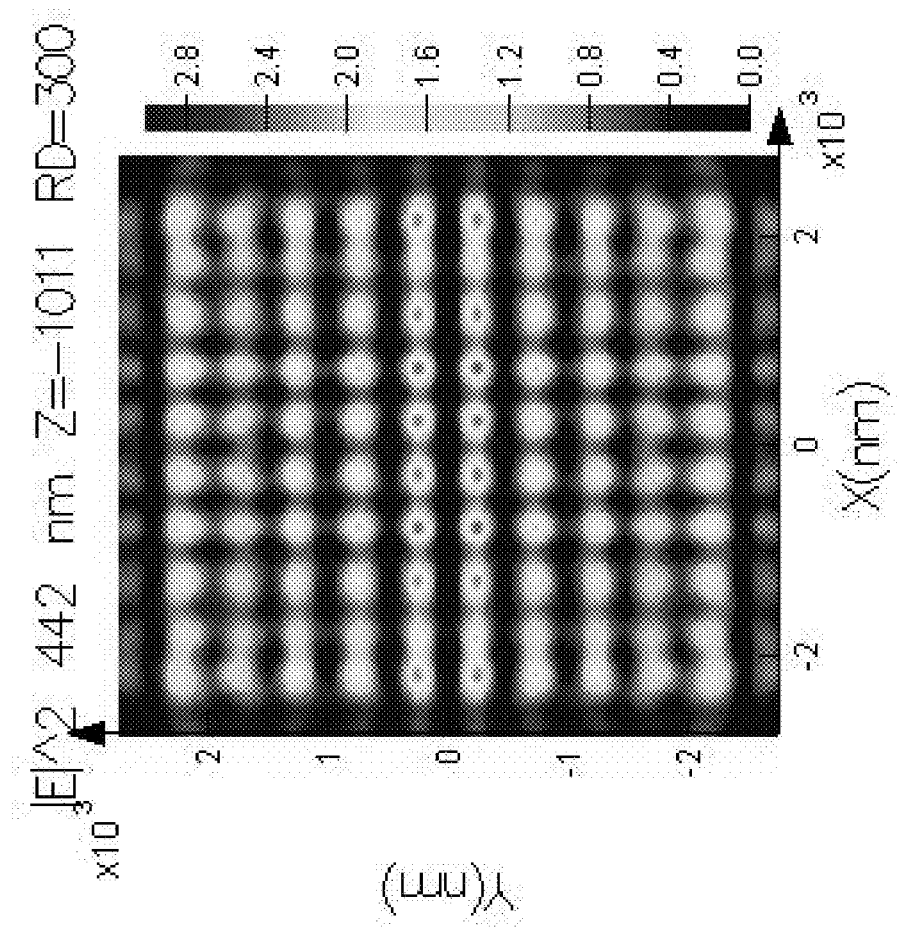
Figure 6F:
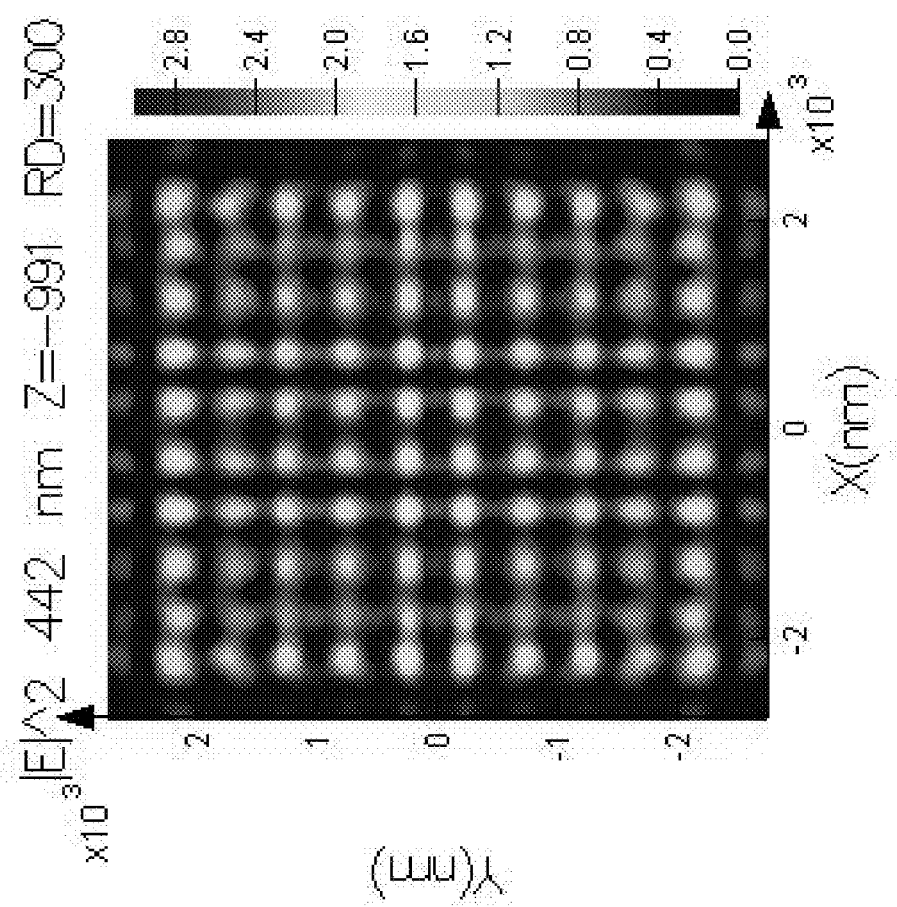
Figure 6G:
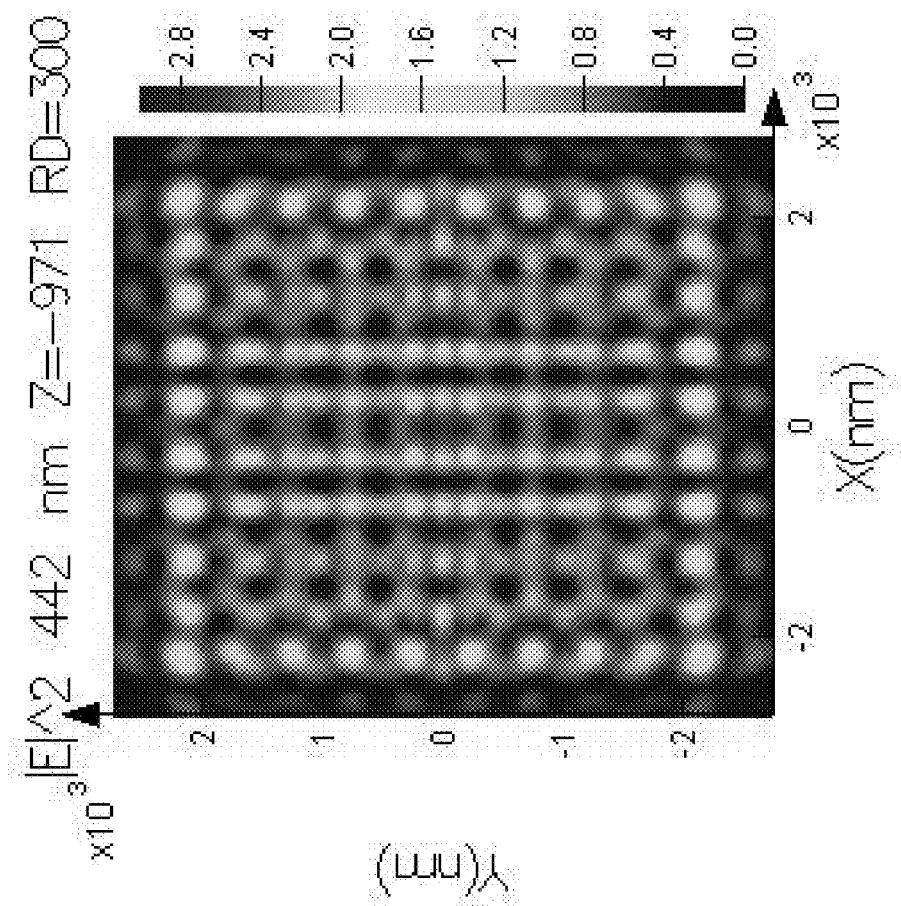
Figure 6H:
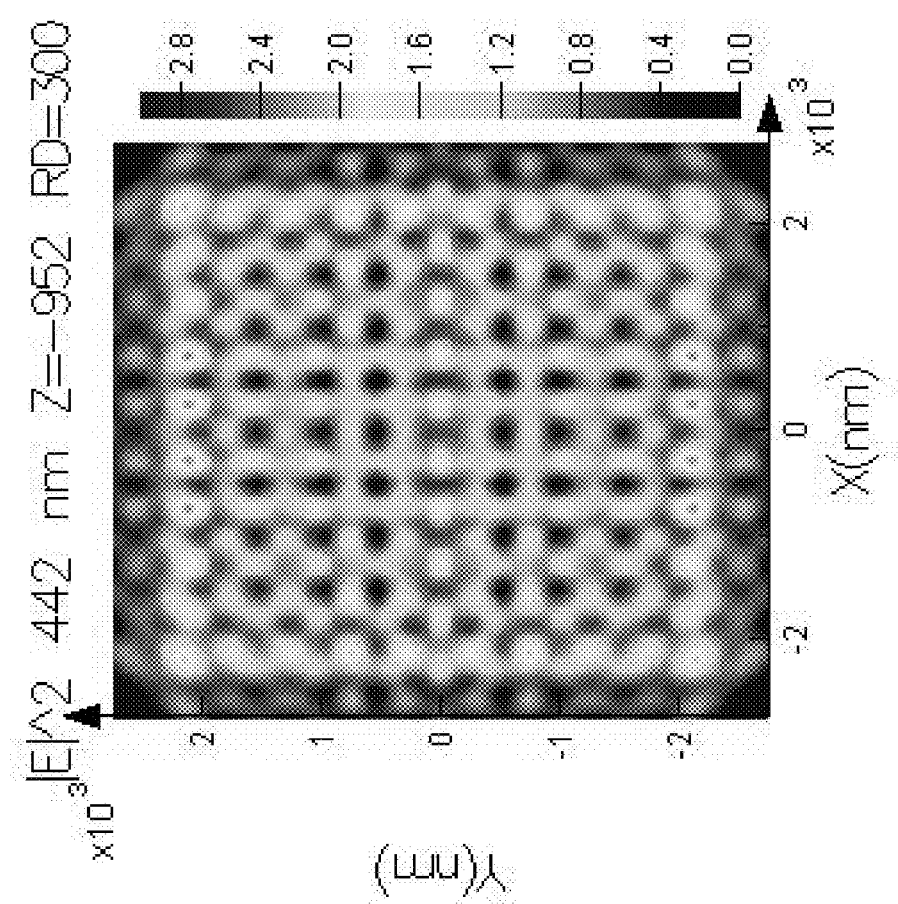
Figure 6I:
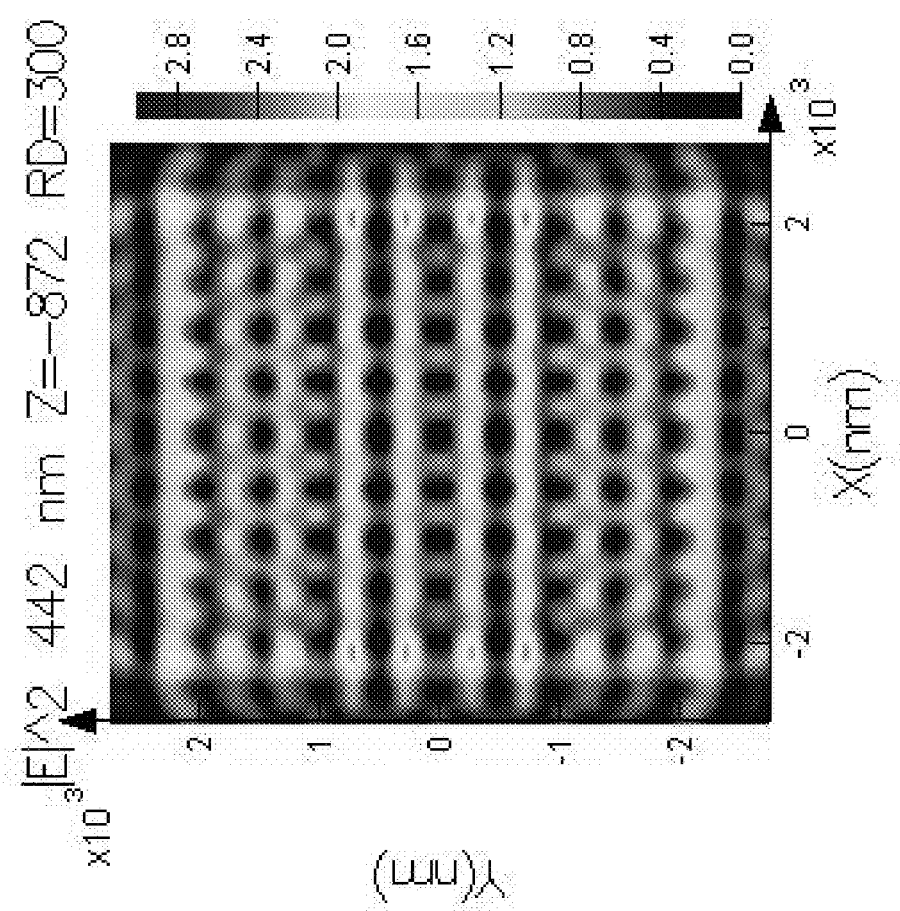

From such models, the present disclosure now identifies the development of analytic solutions for the relationship between the unit-cell dimension of the grid and associated wire diameter, which collectively are employed to excite SPPs in resonance with a molecule's fundamental vibrations (FIG. 5). FIG. 5 shows the analytic solutions for the relationship between unit cell dimensions and wire diameter suitable for plasmon and SPP excitation in resonance with fundamental vibrations of dihydrogen in a 3-D wire mesh structure. SPP resonance conditions were computed for Au-vacuum and Au-dihydrogen interfaces. The same methods and corresponding solutions are also applicable to other molecules of interest, such as carbon dioxide, carbon monoxide, and methane.

Fabrication of a free-standing, 3-D mesoscale wire grids of the preferred embodiment (FIG. 3) may be approached along several fronts. For example, one may employ optical-phase-mask lithography (OPML) combined with proximity nano-patterning (PnP). The 3-D structure so formed may be periodic (repetition of a unit cell in one, two or three dimensions) or aperiodic (occurring without periodic structure, or irregular).

OPML utilizes convergent light patterns to effect photo-induced polymerization in a layer of photoresist (e.g., SU-8 aromatic epoxy). The mask for OPML in the present case comprises a transparent elastomer, such as poly(dimethylsiloxane) (PDMS), that is nano-patterned as a relief on one side, such as an array of pillars, and which makes contact with the top surface of the photoresist. The periodicity, diameter, and depth of the nano-patterned PDMS mask dictate the manner in which light patterns modulate in phase and converge in the photoresist from a light source of a given wavelength, polarization, and divergence. This modulation creates 3-D intensity patterns in the photoresist in close proximity to the mask, polymerizing the regions of the pattern with the highest field intensity.

After light exposure, the unpolymerized fraction of the photoresist is removed by a solvent, leaving behind a periodic structure composed of a dielectric. Three-dimensional structures with nearly cubic symmetry have been fabricated from a single phase-mask exposure of SU-8 according to the exemplary techniques of this disclosure. Further steps may then be taken to deposit a conformal coating of metal onto the 3-D dielectric structure, thus enabling surface plasmon activity in the structure with the desired frequency-mode characteristics. These steps include, but are not limited to, electrochemical deposition, deposition by plasma magnetron sputtering, plasma, or chemical vapor.

In an exemplary embodiment of the present disclosure, a laser light source (442 nm) is used to expose a thick slab of SU-8 through a PDMS sub-wavelength optical phase mask (OPM), which generates a spatial phase modulation within the SU-8 slab. The optical intensity profiles predicted from classical, finite difference time domain (FDTD) simulations are illustrated in FIG. 6, in this case for an OPM with periodicity (P) of 504 nm, pillar depth (D) of 400 nm, and pillar diameter (Ø) of 300 nm. The resulting exposure patterns predicted from the simulations yield 3-D wire structures that, after coating with gold, exhibit the desired periodicity and wire diameter to elicit surface plasmons at IR frequencies.

As noted above, the present disclosure relates to a metal-dielectric structure that is capable of exhibiting surface plasmon modes at IR frequencies (1 and 430 THz) when excited by either an external source and/or a vibrational dipole created by a molecule or molecules adsorbed on the surface of the metal-dielectric structure. The adsorbing molecule or molecules may experience physical adsorption wherein the chemical nature of the molecule and surface of the metal dielectric structure remain intact. In addition, the adsorbing molecule or molecules may undergo chemisorptions which may then be driven by a chemical reaction occurring at the surface. In either or both cases, this may then be followed by coupling of the surface bound electric field of the plasmon mode or modes with the molecule, which may then trigger a desired chemical transformation.

Expanding on the above, the embodiments of the present disclosure relate to the feature concept of influencing chemical transformations of molecules from one species to another, or from an initial state to a metastable one, as disclosed herein. Such transformations may now be afforded by coupling the relatively strong, localized electric field of the surface plasmon elicited from the preferred 3-D structure at IR frequencies with select vibrational modes of molecules which may exist in ground- or excited states. While therefore not limiting the utility of the present disclosure to any one or group of chemical transformations, the following exemplary transformations are pertinent and illustrate the surface-plasmon-mediated catalyzed reactions disclosed and contemplated herein:

1. Homolytic dissociation of dihydrogen $$H_2 \rightarrow 2H.$$

2. Reduction of $CO_2$ in the presence of dihydrogen (Sabatier reaction)

$$CO_2 + 4H_2 \rightarrow CH_4 + 2H_2O$$

3. Fischer-Tropsch process $$CH_4 + \tfrac{1}{2}O_2 \rightarrow 2H_2 + CO$$

$$(2n+1)H_2 + CO \rightarrow C_nH_{2n+2} + nH_2O$$

$$2l\,H_2 + nCO \rightarrow C_nH_{2n+2}O + (n-1)H_2O$$

4. Reverse water gas shift reaction $$CO_2 + H_2 \rightarrow CO + H_2O$$

5. Reduction of $NO_x$ in the presence of ammonia and oxygen $$4NO + 4NH_3 + O_2 \rightarrow 4N_2 + 6H_2O$$

$$2NO_2 + 4NH_3 + O_2 \rightarrow 3N_2 + 6H_2O$$

In accordance with the above disclosure, the present invention may therefore relate to one or more of the following structure or process characteristics which may be present alone or in any combination:

A structure capable of causing a chemical transformation of a molecule on the surface of said structure comprising a metal dielectric structure capable of surface plasmon modes at selected frequencies to provide a surface-bound electric field, said electric field is present when said structure is excited by an external source and/or the vibrational dipole created by a molecule or molecules adsorbed on said metal dielectric surface, wherein said surface-bound electric field is capable of coupling with a molecule on the surface of said metal dielectric structure, wherein said molecule undergoes a chemical transformation.

A structure capable of causing a chemical transformation as noted herein, comprising a material containing at least one metal and one dielectric.

A structure capable of causing a chemical transformation as noted herein wherein the structure comprises a three-dimensional wire grid where the structure may be periodic or aperiodic.

A structure capable of causing a chemical transformation as noted herein, wherein the magnitude of the coupling between the surface-bound electric field of the plasmon mode is sufficiently strong to induce a molecule adsorbed on the surface of the structure to undergo bond rearrangement.

A structure capable of causing a chemical transformation as noted herein, wherein the magnitude of the coupling between the surface-bound electric field of the plasmon mode is sufficiently strong to induce a molecule adsorbed on the surface of the structure to undergo bond breaking and bond reforming.

A structure capable of causing a chemical transformation as noted herein, wherein the magnitude of the coupling between the surface-bound electric field of the plasmon mode is sufficiently strong to transform said molecule adsorbed on the surface of the structure into a metastable state.

A structure capable of causing a chemical transformation as noted herein, wherein the magnitude of the coupling between the surface-bound electric field of the plasmon mode is sufficiently strong to induce a molecule adsorbed on the surface of the structure to undergo isomerization.

A process for causing a chemical transformation of a molecule on the surface of a structure comprising supplying a metal dielectric structure capable of surface plasmon modes at selected frequencies providing a surface-bound electric field, said electric field is present when said structure is excited by an external source and/or the vibrational dipole created by a molecule or molecules adsorbed on said metal dielectric surface, wherein said surface-bound electric field is capable of coupling with a molecule on the surface of said metal dielectric structure, wherein said molecule undergoes a chemical transformation due to molecular vibration, and wherein the coupling between the surface-bound electric field of the plasmon mode and said molecular vibration are detected as absorption and/or change in transmission.

The process as noted herein, wherein the adsorption and/or change in transmission is achieved with a photon detector.

The process as noted herein where the coupling between the surface-bound electric field of the plasmon mode and said molecular vibration are detected as a change in heat flow relative to a reference state utilizing a thermal detector.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A structure capable of causing a chemical transformation of a molecule on the surface of said structure comprising:
    a metal dielectric structure comprising dielectric wire and a metal coating wherein said metal dielectric structure comprises a 3-D metal-wire grid with periodic cubic symmetry capable of surface plasmon modes at frequencies between 1 and 430 THz to provide a surface-bound electric field, said electric field present when said metal dielectric structure is excited by an external source and/or the vibrational dipole created by a molecule or molecules adsorbed on said metal dielectric surface;
    wherein said surface-bound electric field is capable of coupling with a selected vibrational mode of a molecule on the surface of said metal dielectric structure, wherein said molecule undergoes a chemical transformation.

2. The structure of claim 1 wherein the magnitude of the coupling between the surface-bound electric field of the plasmon mode is sufficiently strong to induce a molecule absorbed on the surface of the metal dielectric structure to undergo bond rearrangement.

3. The structure of claim 1 wherein the magnitude of the coupling between the surface-bound electric field of the plasmon mode is sufficiently strong to induce a molecule absorbed on the surface of the metal dielectric structure to undergo bond breaking and bond reforming.

4. The structure of claim 1 wherein the magnitude of the coupling between the surface-bound electric field of the plasmon mode is sufficiently strong to transform said molecule adsorbed on the surface of the metal dielectric structure into a metastable state.

5. The structure of claim 1 wherein said metastable state of said molecule comprises the presence of a free radical, a cation or an anion.

6. The structure of claim 1 wherein the magnitude of the coupling between the surface-bound electric field of the plasmon mode is sufficiently strong to induce a molecule adsorbed on the surface of the metal dielectric structure to undergo isomerization.

7. The structure of claim 1 wherein said metal dielectric structure includes a metal selected from gold, silver, copper, or lithium.

8. The structure of claim 1 wherein said metal dielectric structure includes a metallic alloy selected from AuLi, $AuAl_2$, $AuGa_2$, $AuIn_2$, $AuNa_2$, or $TiB_2$.

9. The structure of claim 1 wherein said metal dielectric structure includes a dielectric selected from a polymer, a ceramic, a non-conducting metal alloy, or air.

10. The structure of claim 1 wherein said molecule on said metal dielectric structure surface comprises hydrogen ($H_2$) which undergoes a chemical transformation to form a hydrogen radical (H·).

11. The structure of claim 1 wherein said molecule on said metal dielectric structure surface comprises methane ($CH_4$) which undergoes a chemical transformation in the presence of oxygen to form carbon monoxide.

12. The structure of claim 1 wherein said molecule on said metal dielectric structure surface comprises nitrous oxide ($NO_x$) which undergoes a chemical transformation comprising a reduction in the presence of ammonia and oxygen.

13. A process for causing a chemical transformation of a molecule on the surface of a structure comprising:
    supplying a metal dielectric structure comprising dielectric wire and a metal coating wherein said metal dielectric comprises a 3-D metal-wire grid with periodic cubic symmetry capable of surface plasmon modes at selected frequencies between 1 and 430 THz providing a surface-bound electric field, said electric field is present when said metal dielectric structure is excited by an external source and/or the vibrational dipole created by a molecule or molecules adsorbed on said metal dielectric structure surface;
    supplying a molecule or molecules to said metal dielectric structure for absorption onto said metal dielectric structure surface;
    wherein said surface-bound electric field is coupled with a selected vibrational mode of a molecule on the surface of said metal dielectric structure;
    wherein said adsorbed molecule undergoes a chemical transformation due to molecular vibration, and wherein the coupling between the surface-bound electric field of the plasmon mode and said molecular vibration are detected as: (i) absorption and/or change in transmission; and/or (ii) heat flow relative to a reference state.

14. The process of claim 13 wherein the magnitude of the coupling between the surface-bound electric field of the plasmon mode is sufficiently strong to induce a molecule absorbed on the surface of the metal dielectric structure to undergo bond rearrangement.

15. The process of claim 13 wherein the magnitude of the coupling between the surface-bound electric field of the plasmon mode is sufficiently strong to induce a molecule absorbed on the surface of the metal dielectric structure to undergo bond breaking and bond reforming.

16. The process of claim 13 wherein the magnitude of the coupling between the surface-bound electric field of the plasmon mode is sufficiently strong to transform said molecule absorbed on the surface of the metal dielectric structure into a metastable state.

17. The process of claim 16 wherein said metastable state of said molecular transformation comprises the presence of a free radical, a cation or an anion.

18. The process of claim 13 wherein the magnitude of the coupling between the surface-bound electric field of the plasmon mode is sufficiently strong to induce a molecule adsorbed or chemisorbed on the surface of the metal dielectric structure to undergo isomerization.

\* \* \* \* \*